(12) United States Patent
Nelson

(10) Patent No.: US 10,993,580 B2
(45) Date of Patent: May 4, 2021

(54) GRILLING APPLIANCE WITH LOWER PLATEN POSITION CONTROL

(71) Applicant: TAYLOR COMMERCIAL FOODSERVICE, LLC, Rockton, IL (US)

(72) Inventor: Dennis J. Nelson, Rockford, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 215 days.

(21) Appl. No.: 16/159,141

(22) Filed: Oct. 12, 2018

(65) Prior Publication Data

US 2019/0038073 A1 Feb. 7, 2019

Related U.S. Application Data

(63) Continuation of application No. 14/695,096, filed on Apr. 24, 2015, now Pat. No. 10,098,499.

(60) Provisional application No. 61/983,549, filed on Apr. 24, 2014.

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC ............. A47J 2037/0617; A47J 37/0611
USPC .......... 99/379, 391, 393, 349, 400, 422, 425
See application file for complete search history.

(56) References Cited

U.S. PATENT DOCUMENTS

| | | |
|---|---|---|
| 4,715,357 A | 12/1987 | Sherman et al. |
| 4,852,545 A | 8/1989 | Sherman et al. |
| 4,913,040 A | 4/1990 | Sherman et al. |
| 5,910,207 A | 6/1999 | Newton et al. |
| 5,970,851 A | 10/1999 | Masel et al. |
| 6,016,743 A | 1/2000 | Glavan |
| 6,079,321 A | 6/2000 | Harter et al. |
| 6,614,007 B1 | 9/2003 | Reay |
| 7,082,941 B2 | 8/2006 | Jones et al. |
| 7,131,549 B2 | 11/2006 | Hook |
| 7,913,615 B2 | 3/2011 | Calzada et al. |
| 7,954,422 B2 | 6/2011 | Nevarez et al. |
| 8,109,202 B2 | 2/2012 | Nevarez et al. |
| 8,359,970 B2 | 1/2013 | Calzada et al. |
| 8,555,777 B2 | 10/2013 | Calzada et al. |
| 8,833,243 B2 | 9/2014 | Sands et al. |
| 2004/0129693 A1 | 7/2004 | Hook |
| 2013/0071534 A1 | 3/2013 | Newton |
| 2014/0023755 A1 | 1/2014 | Claesson et al. |

(Continued)

FOREIGN PATENT DOCUMENTS

WO 2014/144335 9/2014

*Primary Examiner* — Reginald Alexander
(74) *Attorney, Agent, or Firm* — Barnes & Thornburg LLP

(57) ABSTRACT

A grill is provided including a base structure. An upper platen assembly is connected to the base structure and includes an upper grilling surface. A lower platen assembly is connected to the base structure and includes a lower grilling surface. A plurality of leveling mechanisms is mounted to the base structure with a mounting bracket. A portion of each leveling mechanism is arranged in contact with the lower platen assembly. The leveling mechanisms are configured to automatically level the lower grilling surface relative to the upper grilling surface. Each of the plurality of leveling mechanisms is configured to independently move a portion of the lower grilling surface about a different axis.

20 Claims, 6 Drawing Sheets

(56) References Cited

U.S. PATENT DOCUMENTS

| | | |
|---|---|---|
| 2014/0026764 A1 | 1/2014 | Sykes et al. |
| 2014/0161953 A1 | 6/2014 | Jones et al. |
| 2015/0145503 A1 | 5/2015 | Freymiller et al. |
| 2015/0305554 A1 | 10/2015 | Dorsten et al. |
| 2015/0305555 A1 | 10/2015 | Nelson |
| 2016/0022091 A1 | 1/2016 | Freymiller et al. |
| 2016/0037967 A1 | 2/2016 | Glavan et al. |
| 2016/0045066 A1 | 2/2016 | Sands et al. |

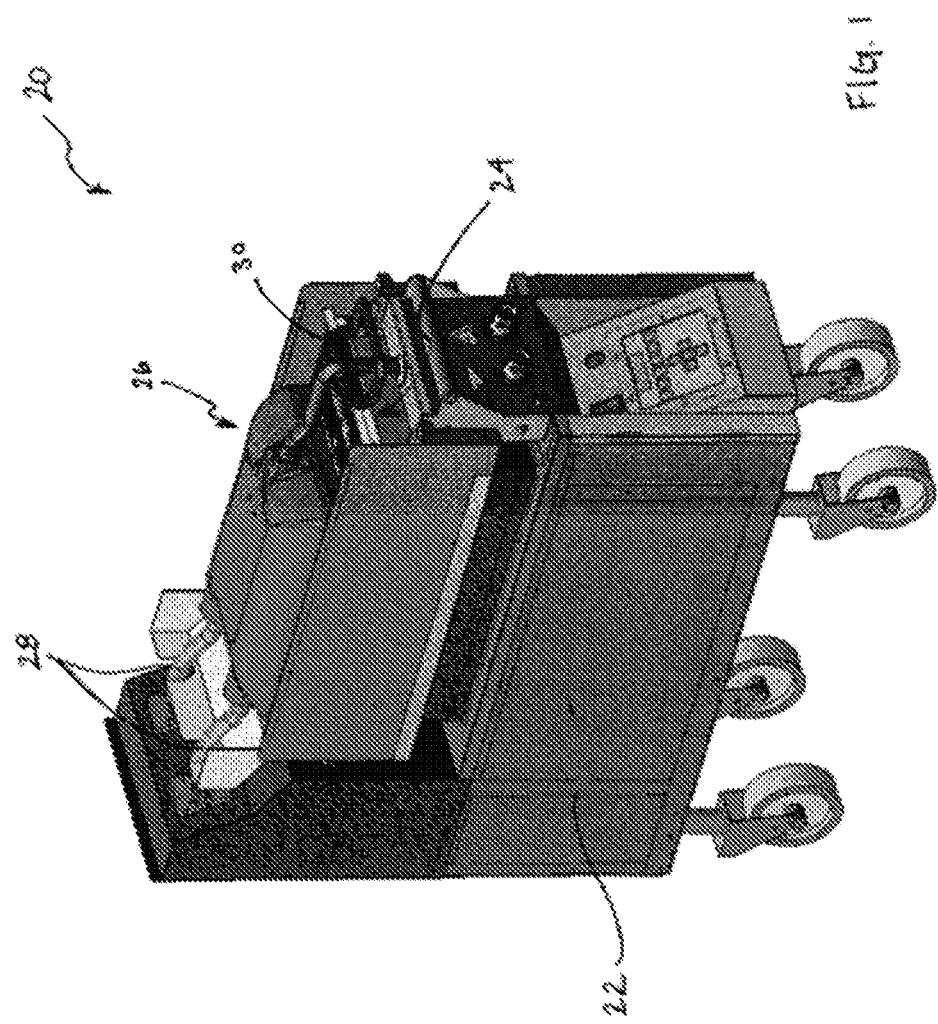

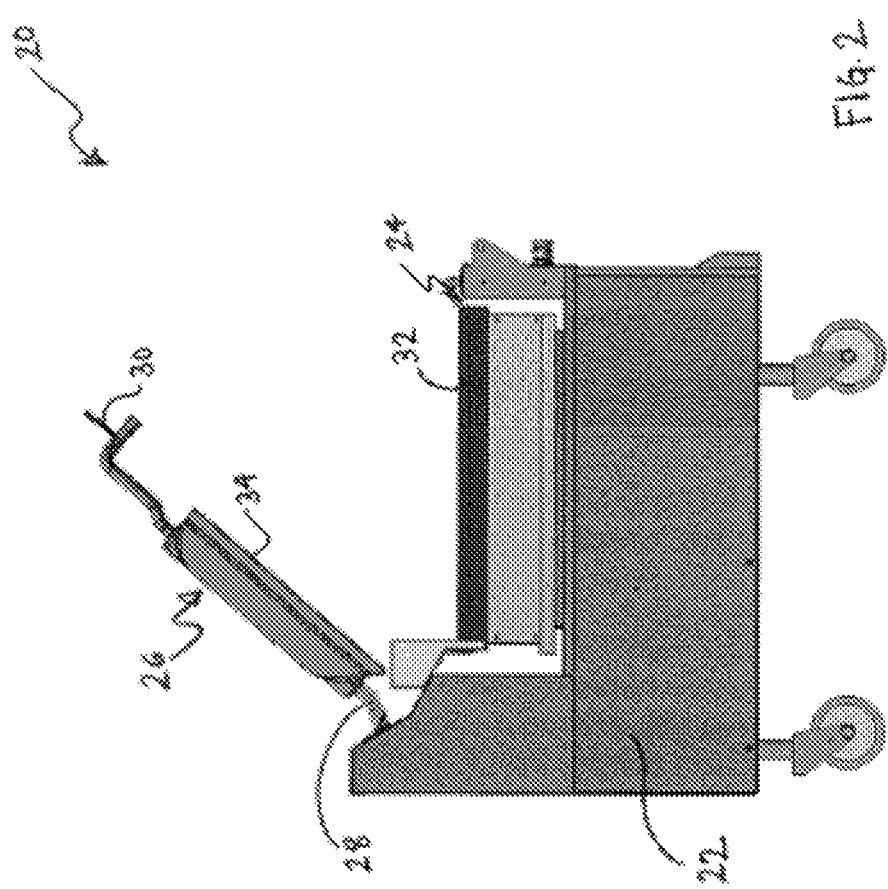

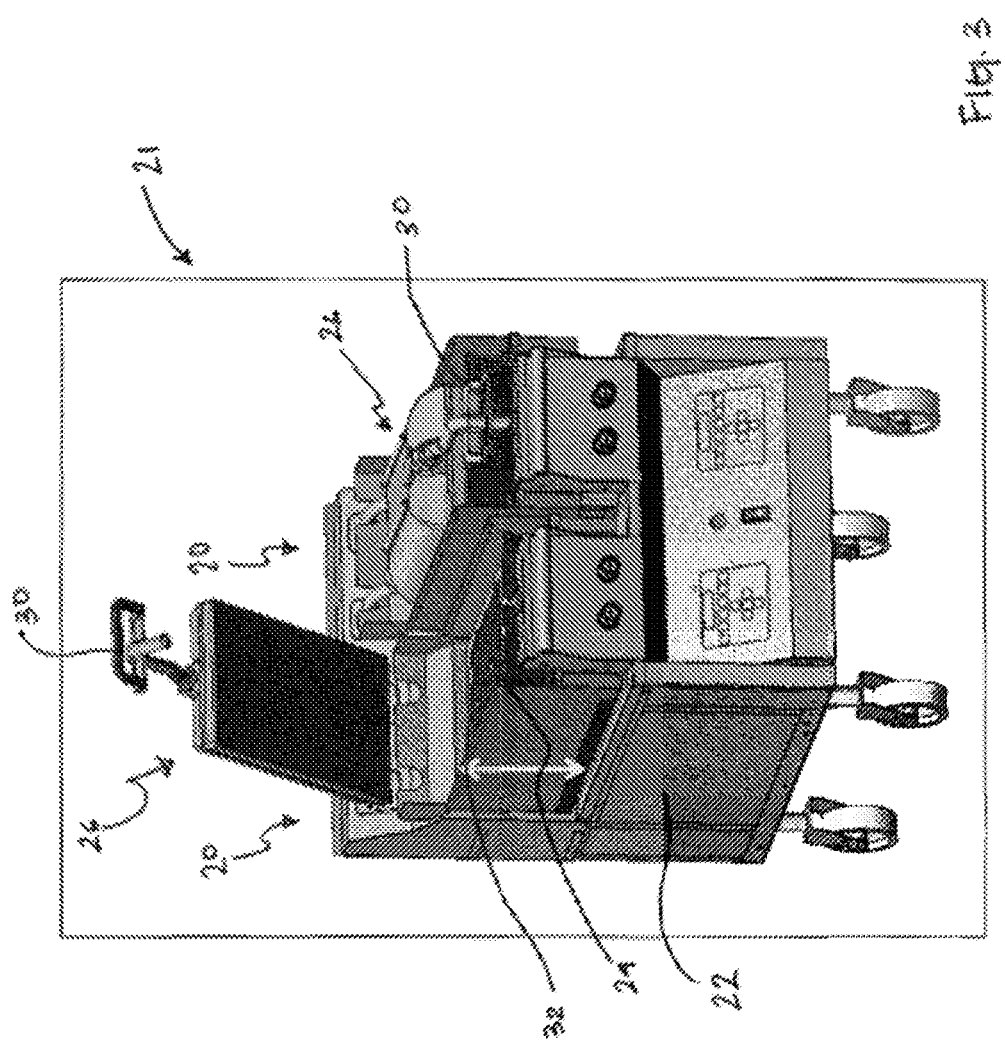

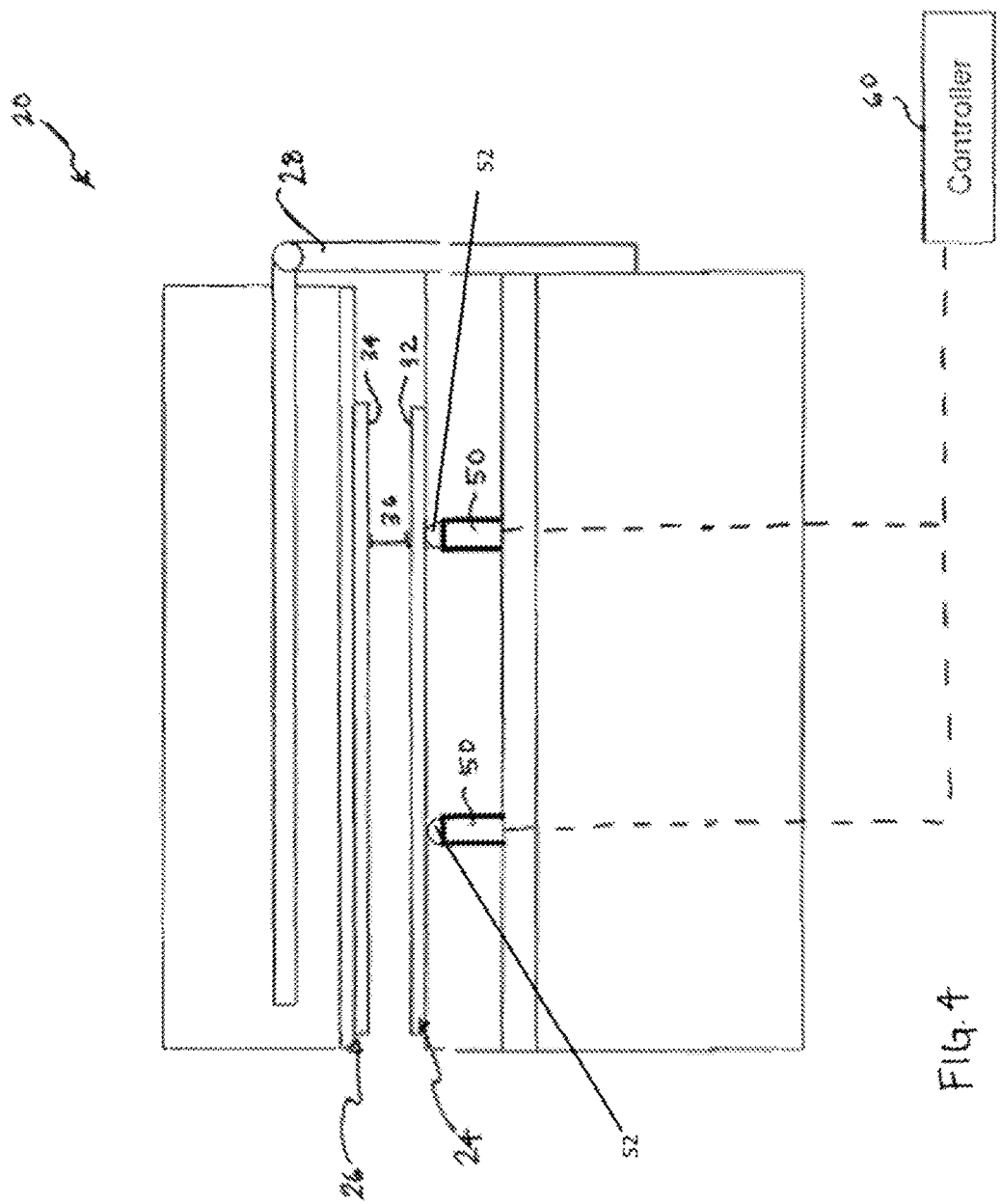

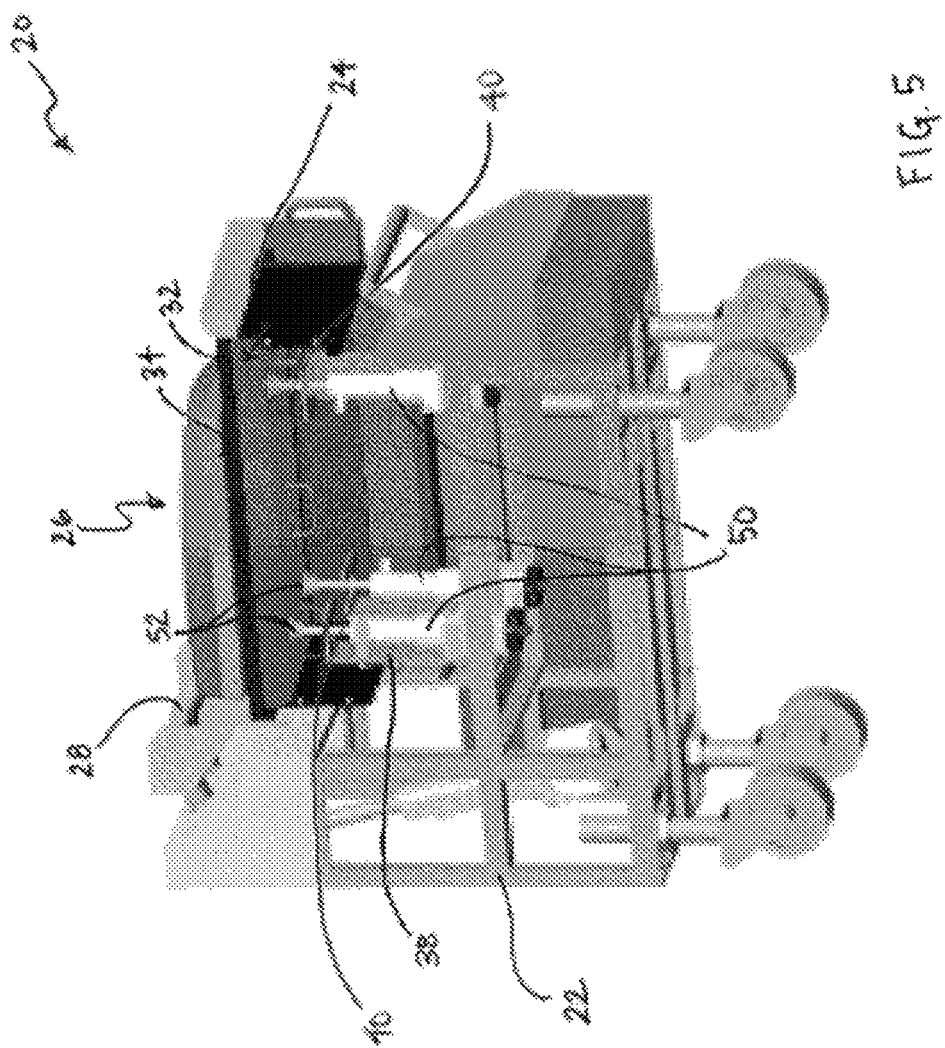

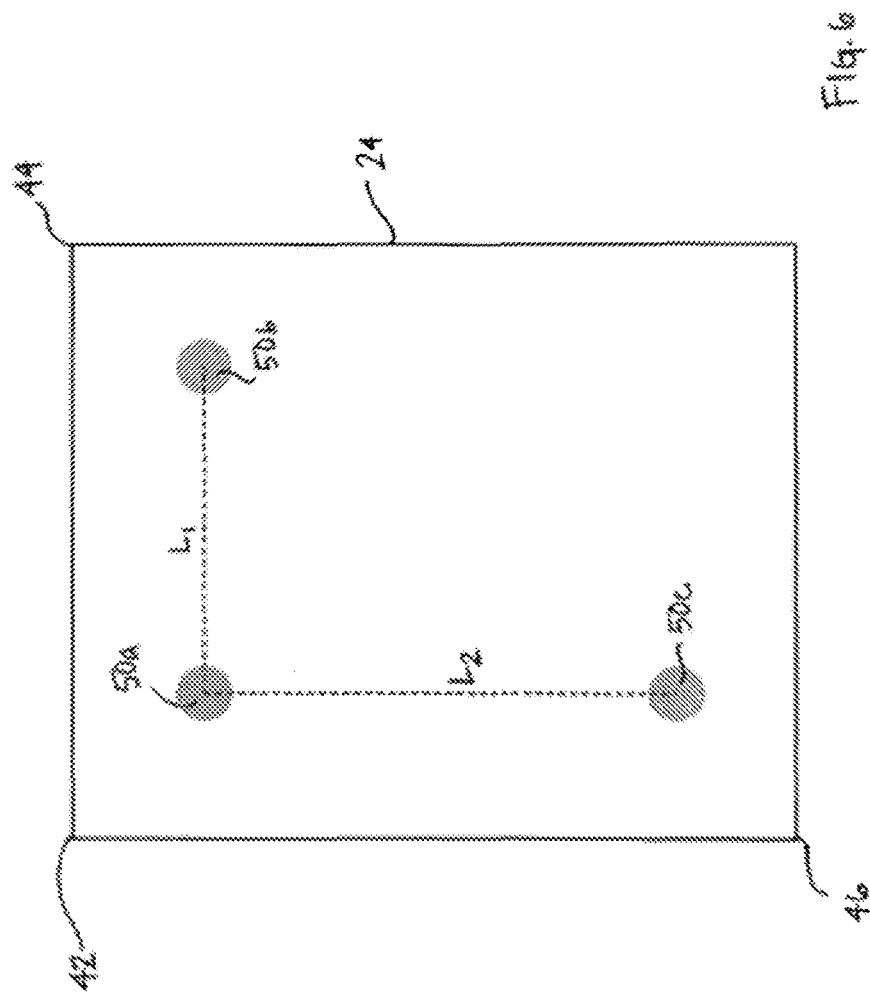

GRILLING APPLIANCE WITH LOWER PLATEN POSITION CONTROL

CROSS-REFERENCE TO RELATED APPLICATION

This application is a continuation of U.S. patent application Ser. No. 14/695,096, which issued on Oct. 16, 2018 as U.S. Pat. No. 10,098,499 and claims the benefit of U.S. provisional patent application Ser. No. 61/983,549 filed Apr. 24, 2014, the entirety of each are incorporated herein by reference.

BACKGROUND OF THE INVENTION

The present invention relates generally to a grill, and more particularly to a grill that automatically calibrates a gap between an upper grilling surface and a lower grilling surface.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

Other conventional grills, such as clamshell grills for example, are capable of simultaneously cooking two sides of various food items, such as hamburger patties, sausage patties, chicken, or other foods. In particular, clamshell grills are often used in commercial establishments, such as fast-food restaurants for example, because they reduce overall cooking time and the amount of operator attention required for cooking.

A conventional clamshell grill generally includes an upper platen assembly movably connected to a lower platen assembly. For example, the upper platen assembly may be pivotally coupled to the lower platen assembly for movement between a lower cooking position overlying the lower platen assembly and a raised position inclined upwardly from the lower platen assembly. When the upper platen assembly is in the lowered cooking position, a gap is created between the upper and lower platen assemblies. This gap is generally adjustable according to the thickness of the food being cooked. For example, hamburger patties are pre-formed in several different sizes (i.e. a quarter pound patty has a greater thickness than a regular patty). To cook the food, an operator selects the gap size and a cooking time via an operator interface for the food item being cooked.

One problem with conventional clamshell grills is that the compression force applied by the upper platen assembly on the food being cooked is limited to the weight of the platen. In addition, the components configured to level the upper platen assembly are positioned generally above the upper platen assembly. As a result, the leveling components are arranged within a high temperature area, and the excessive heat can affect the reliability and operation of the leveling component.

BRIEF DESCRIPTION OF THE INVENTION

According to an embodiment of the invention, a grill is provided including a base structure. An upper platen assembly is connected to the base structure and includes an upper grilling surface. A lower platen assembly is connected to the base structure and includes a lower grilling surface. A plurality of leveling mechanisms is mounted to the base structure with a mounting bracket. A portion of each leveling mechanism is arranged in contact with the lower platen assembly. The leveling mechanisms are configured to automatically level the lower grilling surface relative to the upper grilling surface. Each of the plurality of leveling mechanisms is configured to independently move a portion of the lower grilling surface.

According to another embodiment of the invention, a method of repositioning a lower grilling surface of a grill having a lower platen assembly including the lower grilling surface and an upper platen assembly including an upper grilling surface including moving the lower grilling surface to a predefined reference position away from the upper grilling surface. The position of the lower grilling surface is adjusted such that the lower grilling surface is substantially parallel with the upper grilling surface. The lower grilling surface is moved towards the upper grilling surface to define a desired gap there between.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 schematically illustrates a perspective view of a grill in a lowered position according to an embodiment of the invention;

FIG. 2 schematically illustrates a perspective view of a grill in a raised position according to an embodiment of the invention;

FIG. 3 schematically illustrates a perspective view of a grill assembly having a plurality of grills according to an embodiment of the invention;

FIG. 4 schematically illustrates a cross-sectional view of a grill according to an embodiment of the invention;

FIG. 5 schematically illustrates a perspective view of a grill having a portion of the base structure removed according to an embodiment of the invention; and FIG. 6 schematically illustrates a top view of a lower platen of the grill according to an embodiment of the invention.

DETAILED DESCRIPTION OF THE INVENTION

Referring now to the FIGS., a grill 20 is illustrated having a rigid base structure 22 supporting a lower platen assembly 24 and an upper platen assembly 26. The upper platen assembly 26 may be fixed relative to the base structure 22 or alternatively, may be movably attached to the base structure 22 with a mounting structure 28 such that the upper platen assembly 26 is configured to move between an upper raised position and a lowered, cooking position relative to the lower platen assembly 24. In one embodiment, the mounting structure 28 is a hinge such that the upper platen assembly 26 is configured to pivot relative to the lower platen assembly; however, in other embodiments, the upper platen assembly 26 may be vertically lowered and raised in a generally linear motion. The upper platen assembly 26 may be moved between the raised and lowered positions either automatically or manually. In embodiments where the upper platen assembly 26 is moved manually, the upper platen assembly 26 may include a handle 30 (FIG. 1) that can be grabbed by an operator to move the upper platen assembly 26.

The lower platen assembly 24 includes a lower grilling surface 32 and the upper platen assembly 26 includes an upper grilling surface 34. Food items are placed on the lower grilling surface 32 by the operator for cooking. The operator moves the upper platen assembly 26, such as via handle 30 or by automatically by pressing a button for example, to the lowered position such that the one or more food items to be cooked are positioned within a gap 36 formed between the upper and lower grilling surfaces 32, 34.

The tower grilling surface 32 is configured to provide heat to the lower side of one or more food items placed thereon and the upper grilling surface 34 is configured to provide heat to an upper side of the food items located on the lower grilling surface 32. The upper and lower grilling surfaces 32, 34 are heated by a heater (not shown) to cook the food items. In order to transmit heat to the food items cooked by the grill, the lower and upper grilling surfaces 32, 34, respectively, may be formed of a heat-conducting material, such as east aluminum, abrasion-resistant steel, cast iron, stainless steel, mild steel, a ceramic material, or other suitable heat conducting materials used in grills. Although the lower and upper grilling surfaces 32, 34 are shown as having a rectangular shape, one or both of the grilling surface 32, 34 may also be formed into other shapes, such as circular or oval shapes for example. As illustrated in FIG. 2, a plurality of individual grills 20 may be arranged adjacent one another to form a grill assembly 21. In one embodiment, a portion of each grill 20, such as the base structure 22 for example, is integrally formed.

As shown in FIGS. 3-6, the lower platen assembly 24 includes a plurality of leveling mechanisms 50 for controlling the tilt, angle, and/or attitude of the grilling surface 32 of the lower platen assembly 24. In one embodiment, the leveling mechanisms 50 are actuators, such as linear actuators for example, configured to move the lower platen assembly 24 generally vertically, such as along a y-axis for example. In the illustrated, non-limiting embodiment, a first leveling mechanism 50a is mounted to the base structure 22 of the grill 20, such as with a mounting bracket 38 for example, such that the leveling mechanism 50a is configured to contact the tower platen assembly 24 near a first corner 42. A second leveling mechanism 50b is similarly connected to the base structure 22 and is configured to contact the lower platen assembly 24 near a second corner 44. In one embodiment, a line L1 extending between the first leveling mechanism 50a and the second leveling mechanism 50b is generally parallel to the end of the lower platen assembly 24 extending between the first corner 42 and the second corner 44. A third leveling mechanism 50c is configured to contact the lower platen assembly 24 near a third corner 46. The line L2 extending between the first leveling mechanism 50a and the third leveling mechanism 50c is generally parallel to the end of the lower platen assembly 24 extending between the first corner 42 and the third corner 46. As a result, the plurality of leveling mechanisms 50 forms a triangle or L-shape such that the line L2 formed between the first leveling mechanism 50a and the third leveling mechanism 50c is substantially perpendicular to the line L1 formed between the first leveling mechanism 50a and the second leveling mechanism 50b.

A control 60 is configured to independently operate each of the plurality of leveling mechanisms 50 to adjust the position of the lower grilling surface 32. As a result, the lower grilling surface 32 may be arranged in a non-horizontal configuration. To maintain contact with the lower platen assembly 24, such as when the lower grilling surface 32 is arranged at an angle, the end 52 of each leveling mechanism 50 configured to contact the lower platen assembly 24 includes a spherical bearing (not shown). In addition, the mounting bracket 38 connecting at least one of the leveling mechanisms 50 to the base structure 22 allows the leveling mechanism 50 to pivot to prevent the leveling mechanism 50 from binding and to maintain contact between the leveling mechanism 50 and the lower platen assembly 24. For example, the second leveling mechanism 50b may be pivotally mounted such that the leveling mechanism 50b is configured to rotate toward and away from the first leveling mechanism 50a, such as about a first axis for example. Similarly, the mounting bracket 38 connecting the third leveling mechanism 50c to the base structure 22 allows the third leveling mechanism 50c to pivot toward and away from the first leveling mechanism 50a, such as about a second axis for example. The first axis and the second axis are substantially different axes, for example an X-axis and a Z-axis. The first leveling mechanism 50a, however, is rigidly fixed to a respective mounting bracket 38 to provide stability to the lower platen assembly 24. As a result, the first leveling mechanism 50a is only able to move generally linearly, such as to move the lower grilling surface vertically about a Y-axis for example.

Each mounting bracket 38 additionally includes a stop member 40. Together the stop members 40 provide a hard stop and define a lower reference position for the grilling surface 32 of the lower platen assembly 24. Although the grill 20 is illustrated and described as having three leveling mechanisms 50, it should be understood that a grill 20 having any number of leveling mechanisms 50 is within the scope of the invention.

Operation of the first leveling mechanism 50a in a first direction causes the first leveling mechanism 50a to extend and a portion of the lower platen assembly 24 to move toward the upper platen assembly 26. Similarly, operation of the first leveling mechanism 50a in a second, opposite direction causes the first leveling mechanism 50a to retract, such that the lower platen assembly 24 separates and moves away from the upper platen assembly 26. Although only operation of the first leveling mechanism 50a is described, each of the plurality of leveling mechanisms 50 operates in a similar manner.

The grill 20 may be automatically calibrated to ensure that the gap 36 between the lower grilling surface 32 and the upper grilling surface 34 is maintained at a desired size. By calibrated, it is meant that the upper grilling surface 34 and the lower grilling surface 32 are level to one another to ensure proper cooking of food items. In one example, the grill 20 is calibrated daily to correct any unleveling of the lower grilling surface 32 that may have occurred during the previous day.

To calibrate the lower grilling surface 32 to the upper grilling surface 34, the upper platen assembly 26 is lowered in embodiments where the upper platen assembly 26 is movable between a raised and lowered position. When in the lowered position, the upper grilling surface 34 is arranged at a predetermined reference position. Upon initiation of the calibration sequence, the control 60 sends a signal to each of the plurality of leveling mechanisms 50 to move the lower grilling surface 32 in a first direction, towards the upper grilling surface 34 located at the predetermined reference position. One or more sensors (not shown) are configured to monitor each of the plurality of leveling mechanisms 50 and detect when the lower grilling surface 32 contacts the upper grilling surface 34. In one embodiment, the sensors are Hall Effect sensors or encoders configured to monitor the position of a movable portion 54 of the leveling mechanisms 50 and determine when each leveling mechanism 50 reaches a stall position. Alternatively, other types of sensors, such as sensors configured to monitor current, load, or another characteristic of the plurality of leveling mechanisms 50 for example, is also within the scope of the invention.

Upon determination that the lower grilling surface 32 adjacent each of the plurality of leveling mechanisms 50 has contacted the upper grilling surface 34, the position of each of the plurality of leveling mechanisms 50, and therefore of the lower grilling surface 32 is recorded. The leveling mechanisms 50 are then operated in a second, opposite direction in unison such that the lower grilling surface 32 will maintain its parallelism with the upper grilling surface 34. As described herein, each of the plurality of leveling mechanisms 50 are calibrated simultaneously. However, the leveling mechanisms 50 may be calibrated individually and sequentially, in any order.

After the initial calibration of the plurality of leveling mechanisms 50, the lower reference position defined by the plurality of stop members 40 can be used to reposition the lower grilling surface 32 to ensure that the parallelism with the upper grilling surface 34 is maintained. For example, if an operator notices that the upper and lower grilling surfaces 32, 34 are not level during use of the grill 20, such as by observing the appearance of one or more food items for example, the operator can initiate a repositioning of the lower grilling surface 32. During the repositioning process, each of the plurality of leveling mechanisms 50 are operated in the second direction until the grilling surface 32 of the lower platen assembly 24 is at the hard stop position defined by the stop members 40. Once in the stop position, the sensors monitoring the leveling mechanisms 50 are zeroed. From the stop position, the leveling mechanisms 30 adjust the lower grilling surface 32 to a position substantially parallel to the upper grilling surface 34, and adjust the overall position of the lower grilling surface 32 to achieve a desired gap 36 based on the type of food item being cooked.

In one embodiment, the grill 20 is configured to remove grease and other debris accumulated on the lower grilling surface 32, such as in response to pressing a button or automatically at the end of each cooking cycle for example. The plurality of leveling mechanisms 50 adjust the position of the lower platen assembly 24 such that the lower grilling surface 32 is generally tilted, with the lower side of the lower platen assembly 24 being arranged adjacent a grease receptacle (not shown). As a result of the slope of the lower grilling surface 32, the grease, water, and other debris collected thereon will move from the lower grilling surface 32 toward the grease receptacle.

Grills 20 having an adjustable lower grilling surface 32 provide many advantages over conventional grills without an adjustable lower grilling surface 32. For instance, maintaining parallelism between the upper and lower grilling surfaces 22, 24 may be performed in a more efficient, cost effective manner. The lower grilling surface 22 can also be accurately repositioned without cleaning either surface 22, 24 using a second reference position instead of performing a full calibration. In addition, the leveling mechanisms 50 can apply a controlled pressure to the lower grilling surface 32 to enhance the sear and taste of the items being cooked thereon. The overall reliability of the grill 20 is also improved by positioning the leveling mechanisms 50 in the base structure 22. Another benefit of the grill 20 is that the positioning of the lower platen assembly 24 may be manipulated to drain any grease that has collected on the lower plate 32. This immediate removal of the grease after the cook cycle provides a safety feature by reducing the amount of grease splatter than can burn the operator.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of repositioning a lower grilling surface of a grill having a lower platen assembly including the lower grilling surface and an upper platen assembly including an upper grilling surface, comprising:
    moving the lower grilling surface to a predefined reference position away from the upper grilling surface, wherein the lower grilling surface is mounted on a plurality of leveling mechanisms, wherein the leveling mechanisms are mounted to a base structure of the grill via mounting brackets, wherein the leveling mechanisms are configured to retract and move the lower grilling surface to the predefined reference position;
    adjusting the position of the lower grilling surface such that the lower grilling surface is substantially parallel with the upper grilling surface, wherein at least one of the mounting brackets is configured to pivot at least one of the leveling mechanisms relative to the base structure such that the leveling mechanisms are configured to adjust the position of the lower grilling surface relative to the upper grilling surface; and
    moving the lower grilling surface towards the upper grilling surface to define a desired gap there between, wherein the leveling mechanisms are configured to expand and move the lower grilling surface towards the upper grilling surface.

2. The method according to claim 1, wherein each of the plurality of leveling mechanisms is operated independently by a control.

3. The method according to claim 2, wherein the plurality of leveling mechanisms are operated simultaneously.

4. The method according to claim 2, wherein after positioning the lower grilling surface substantially parallel to the upper grilling surface, the plurality of leveling mechanisms are operated in unison.

5. The method according to claim 2, wherein the parallel position of the lower grilling surface is stored in the control.

6. The method according to claim 5, wherein the parallel position stored in the control was determined during an initial calibration of the upper grilling surface and the lower grilling surface.

7. The method of calibrating a lower grilling surface relative to an upper grilling surface of a grill having a lower platen assembly including the lower grilling surface and an upper platen assembly including the upper grilling surface, comprising:
    lowering the upper platen assembly to a predetermined reference position;

expanding each of a plurality of leveling mechanisms, wherein the leveling mechanisms are mounted to a base structure of the grill via mounting brackets;

moving the lower grilling surface towards the upper grilling surface, wherein the lower grilling surface is mounted on the leveling mechanisms, wherein the leveling mechanisms are configured to move the lower grilling surface towards the upper grilling surface;

detecting, via at least one sensor, when the lower grilling surface contacts the upper grilling surface;

recording the position of each of the plurality of leveling mechanisms;

retracting each of the leveling mechanisms; and, moving the lower grilling surface away from the upper grilling surface such that the lower grilling surface is substantially parallel with the upper grilling surface, wherein the leveling mechanisms are configured to move the lower grilling surface away from the upper grilling surface.

8. The method of claim 7, wherein the methods steps are performed on a daily basis.

9. The method of claim 7, wherein the at least one sensor is further configured to monitor a position of at least one of the leveling mechanisms.

10. The method of claim 7, wherein the detection step comprises determining when at least one of the leveling mechanisms reaches a stall position.

11. The method of claim 7, wherein the at least one sensor is operably coupled to a control.

12. The method of claim 7, wherein the at least one sensor is configured to monitor a load biased against at least one of the leveling mechanisms.

13. The method of claim 7, further comprising:

lowering the lower grilling surface to a lower reference position, wherein each mounting bracket includes a stop member, wherein the stop members are configured to define the lower reference position of the lower grilling surface;

resetting the at least one sensor;

expanding each of the leveling mechanisms; and, moving the lower grilling surface towards the upper grilling surface such that the lower grilling surface is substantially parallel with the upper grilling surface, wherein the leveling mechanisms are configured to move the lower grilling surface towards the upper grilling surface.

14. The method of claim 7, further comprising:

adjusting the position of the lower grilling surface relative to the upper grilling surface to a desired gap there between, wherein the desired gap is based on a food positioned between the lower grilling surface and the upper grilling surface.

15. The method of removing grease, water and debris from a lower grilling surface of a grill having a lower platen assembly including the lower grilling surface, comprising:

adjusting the position of the lower grilling surface such that the lower grilling surface is tilted, wherein the lower grilling surface is mounted on a plurality of leveling mechanisms, wherein the leveling mechanisms are mounted to a base structure of the grill via mounting brackets, wherein at least one of the mounting brackets is configured to pivot at least one of the leveling mechanisms relative to the base structure such that the leveling mechanisms are configured to adjust the position of the lower grilling surface.

16. The method of claim 15, wherein the tilted grilling surface has a slope to drain the grease and water from the lower grilling surface of the grill.

17. The method of claim 15, wherein the methods steps are performed automatically at the end of a cooking cycle.

18. The method of claim 15, wherein the methods steps are performed in response to a button being pressed.

19. The method of claim 15, wherein the lower grilling surface is tilted toward a receptacle, wherein a lower side of the tilted grilling surface is adjacent to the receptacle.

20. The method of claim 19, further comprising:

collecting the grease, water and debris in the receptacle.

* * * * *